Patented Dec. 12, 1944

2,364,833

UNITED STATES PATENT OFFICE 2,364,833

N-ALLYLNORMORPHINE AND PROCESSES FOR ITS PRODUCTION

John Weijlard, Westfield, N. J., and Arthur E. Erickson, Brooklyn, N. Y., assignors to Merck & Co., Inc., Rahway, N. J., a corporation of New Jersey No Drawing. Application December 6, 1941, Serial No. 421,962

5 Claims. (Cl. 260—285)

This invention relates to N-allylnormorphine, and to processes for producing the same.

The only process for producing N-allylnormorphine previously described in the literature is that of McCawley, Hart and Marsh, Jr. Am. Chem. Soc., 63, 314 (1941). However, we have not succeeded in preparing N-allylnormorphine by that process, and have found no evidence of reaction between N-normorphine and allyl bromide under the conditions described by McCawley et al., the normorphine being recovered substantially quantitatively unchanged.

We have now succeeded in preparing N-allylnormorphine and its salts, such as the hydrobromide, for example, in analytically pure form, and have found that their properties are entirely different than had been reported previously. The analytically pure N-allylnormorphine prepared accordingly to our invention occurs in the form of white crystals of melting point 208–209° C.

We have confirmed the structure of our N-allylnormorphine by methylating the compound to the corresponding N-allyl norcodeine, and comparing that compound with N-allyl-norcodeine prepared according to von Braun [Berichte 49, 977, (1916)]. A mixed melting point determination of samples of our N-allylnorcodeine and the product prepared according to von Braun showed no depression.

The following example illustrates a method of carrying out the present invention, but it is to be understood that this example is by way of illustration, and not of limitation.

Example

Thirty-five gms. of normorphine (2 mol. equivalents) and 7.95 gms. of allyl bromide (1 mol. equivalent) in 350 cc. of chloroform are heated in a sealed tube at 110° C. for three and one-half hours. The reaction mixture is filtered, and the solid residue washed with chloroform. From this residue of normorphine hydrobromide, about 18 gms. of normorphine are recovered by dissolving in water and precipitating the base with ammonia water at a pH of 8.

The chloroform solution is evaporated to dryness in vacuo, and the residue triturated with 75 cc. of ether, cooled in an ice bath for two hours, and filtered. The crude N-allyl-normorphine is extracted for 15 hours in a Soxhlet extractor with anhydrous ether. The ether extract is concentrated in absence of air to incipient crystallization, and cooled in the icebox overnight. The white crystals are collected, washed with some ether, and dried in vacuo; melting point 208–209° C.

Anal. calcd. for $C_{19}H_{21}O_3N$: C, 73.26; H, 6.80; N, 4.50. Found: C, 73.19; H, 7.18; N, 4.54.

In the above example, allyl chloride may be used in place of allyl bromide.

The base is soluble in dilute alkali and gives a positive $FeCl_3$ test, indicating a free phenolic group. It is soluble in chloroform, alcohol, and acetone, and sparingly soluble in ether or water.

Salts of the free base may be prepared by treatment thereof with corresponding acids. Thus, for the preparation of the hydrobromide, for instance, the free base is dissolved in ethanol, and a slight excess of alcoholic hydrobromic acid is added; the hydrobromide crystallizes out rapidly on scratching. The crystals are collected, washed with cold alcohol, and dried in vacuo; melting point 258–259° C.

Modifications may be made in carrying out the present invention, but it is to be understood that we are to be limited only by the appended claims.

We claim:

1. A substantially pure substance selected from the group consisting of N-allylnormorphine, a white crystalline solid of formula $C_{19}H_{21}O_3N$, melting at approximately 208–209° C., and salts thereof.

2. Substantially pure N-allylnormorphine, a white crystalline substance of formula $C_{19}H_{21}O_3N$, and melting at approximately 208–209° C.

3. Substantially pure N-allylnormorphine hydrobromide, a crystalline substance melting at approximately 258–259° C.

4. The process comprising reacting normorphine with a substance selected from the group consisting of allyl bromide and allyl chloride in an organic solvent and at a temperature of about 110° C., and recovering substantially pure N-allylnormorphine.

5. The process comprising reacting approximately 2 mol. equivalents of normorphine with approximately 1 mol. equivalent of a substance selected from the group consisting of allyl bromide and allyl chloride, in an organic solvent, and at a temperature of about 110° C., and recovering substantially pure N-allylnormorphine.

JOHN WEIJLARD.
ARTHUR E. ERICKSON.